UNITED STATES PATENT OFFICE.

CLARENCE E. STEERE, OF MILWAUKEE, WISCONSIN, ASSIGNOR TO HENRY SCARBOROUGH, OF MILWAUKEE, WISCONSIN.

ENDLESS CONVEYER.

1,298,115.  Specification of Letters Patent.  Patented Mar. 25, 1919.

Application filed April 3, 1918. Serial No. 226,430.

*To all whom it may concern:*

Be it known that I, CLARENCE E. STEERE, a citizen of the United States, and resident of Milwaukee, in the county of Milwaukee and State of Wisconsin, have invented certain new and useful Improvements in Endless Conveyers; and I do hereby declare that the following is a full, clear, and exact description thereof.

My invention refers to new and useful improvements in endless conveyers, particularly to those of the bucket type.

Heretofore it has been customary to connect the buckets or other conveying members by means of a chain or similar flexible connectors. This not only adds to the cost of manufacturing the conveyers, but when so formed the links in the chain or other parts of the connecting elements are liable to frequent breakage, thereby interrupting the operation of the same. The principal object of my invention is therefore to dispense with the usual conveyer connecting elements. In carrying out this object the buckets or conveying members are directly pivoted to one another.

A less important object of the invention is to provide means on the ends of the buckets or conveying members to be engaged by the teeth of a sprocket wheel in order to drive the conveyer.

With these and other objects in view the invention resides in the novel features of construction, combination and arrangement of parts which will be hereinafter more particularly described, and claimed and shown in the drawings, wherein:

In the accompanying illustrations my invention is embodied in an endless conveyer formed of a plurality of buckets, said buckets being particularly adapted for conveying peas or the like. It is obvious, however, that the conveying members may be constructed in any preferred design and for any desired purpose. Furthermore, the complete conveyer may be arranged in any appropriate manner and driven by any desired form of sprocket.

Each of the buckets A consists of a pair of end plates 1 which are connected by means of a sheet metal plate 2, the latter extending around all except one of the sides of the end plates whereby to form in effect a trough. In the present application the ends are illustrated as being formed of castings, but if desired, other forms of construction not affecting the present invention, may be employed.

Figure 1:
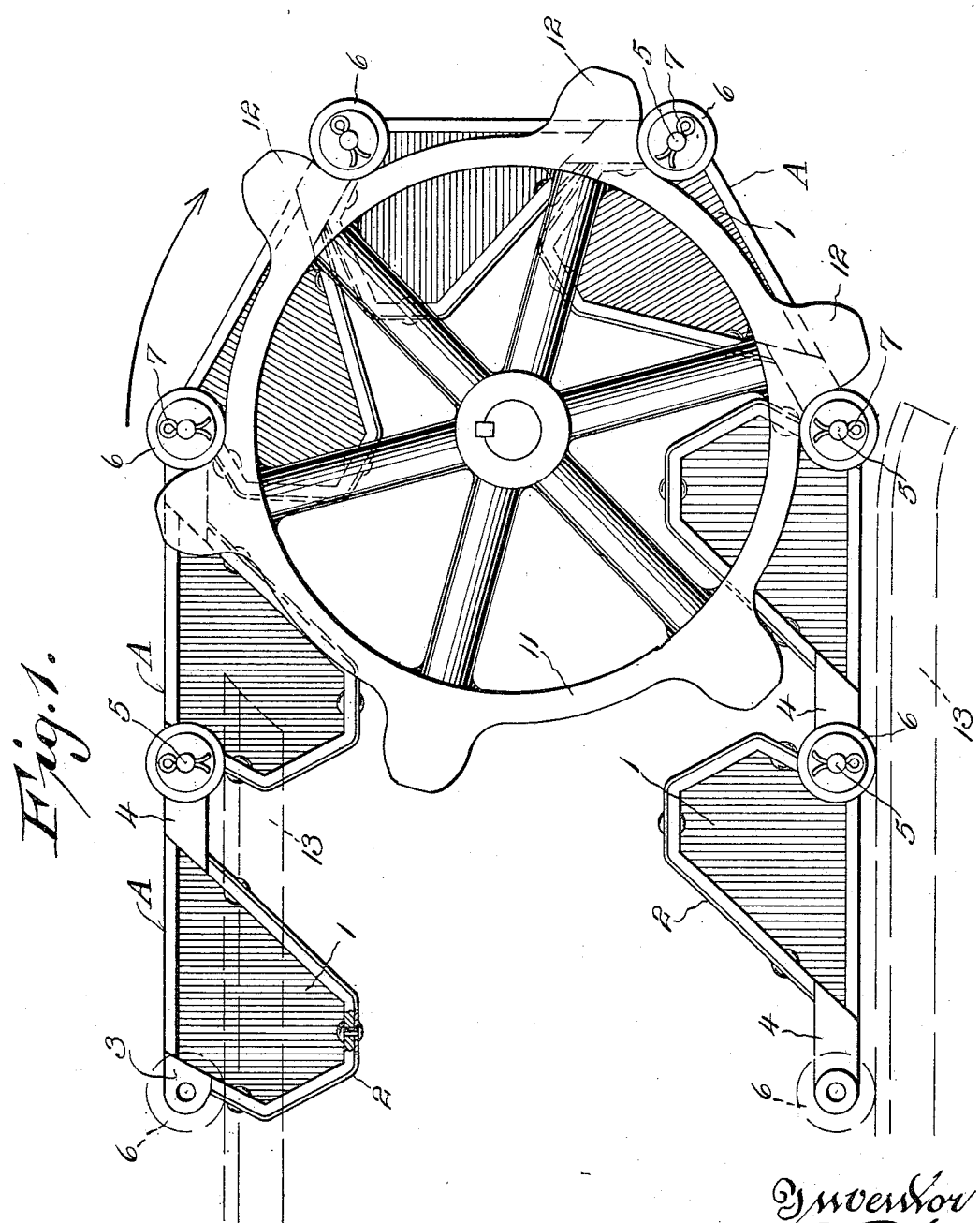
Figure 1 represents a side elevational view of one end of an endless bucket conveyer, said conveyer being driven by a sprocket wheel of a conventional design.
Figure 2:
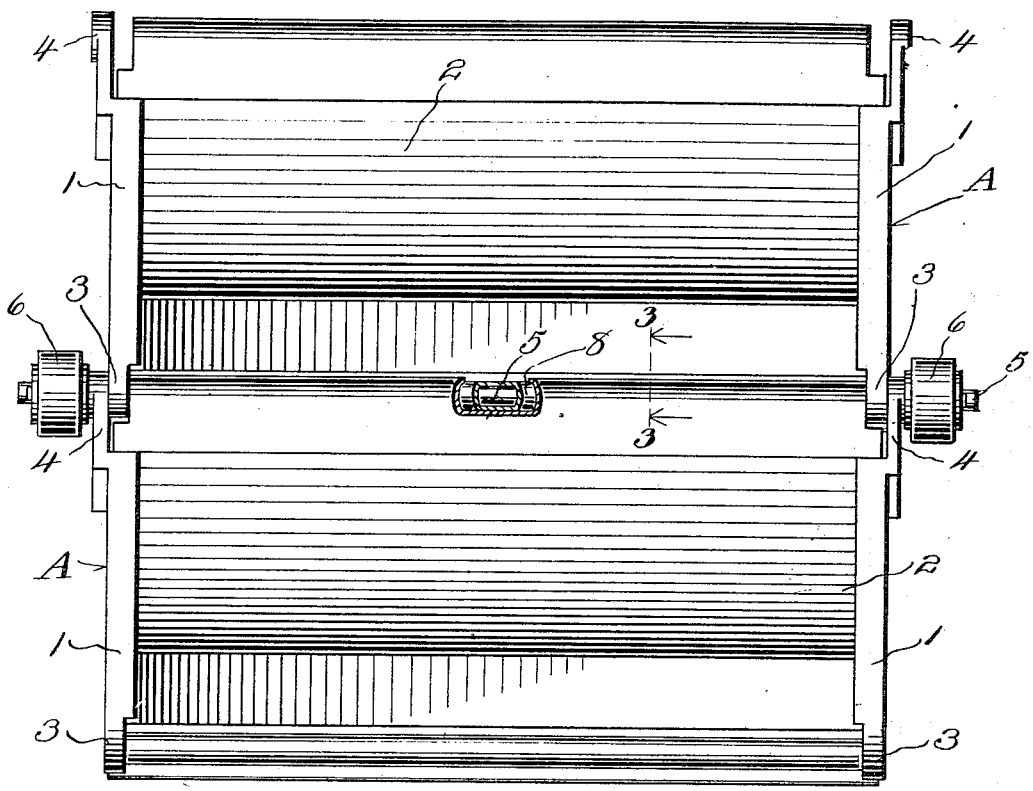
Fig. 2 is a top plan view of a pair of the buckets which form the conveyer.

The principal object of the invention being to connect the buckets to each other, each of the end plates adjacent its top is provided with a pair of laterally extending ears 3 and 4, these ears being extended in opposite directions as clearly shown in Fig. 1. From this figure, it will also be noted that the ears 3 are considerably shorter than the ears 4, said ears 3 on one bucket being adapted to over-lap and thereby coöperate with the ears 4 on the next adjacent bucket. This causes the openings in the coöperating ears to aline for the reception of pivot rods 5, said rods being of greater length than the lengths of the buckets so that their opposite ends will project beyond the adjacent end walls of said buckets.

Figure 3:
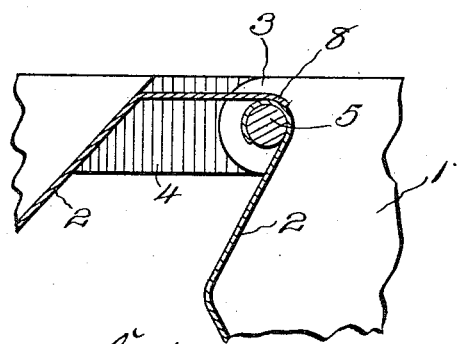
Fig. 3 is a detail transverse view taken substantially on the plane of the line 3—3 of Fig. 2.

The projecting ends of the rods 5 carry rollers 6 which are held thereon by means of cotter pins 7. The pivot rods 5 not only serve to connect the ears of the buckets, but also aid in reinforcing the edges of the plates 2. From Fig. 3 it will be seen that these edges of the plates 2, which form the bottoms of the buckets, over-lap as at 8 to thus prevent any material from being spilled between the several buckets. In other words, any material which is not deposited in one bucket will drop into the next adjacent one.

Figure 4:
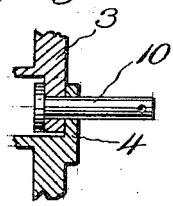
Fig. 4 is a detail sectional view showing a modified construction for connecting the buckets together.

When the pivot rods 5 are used the edges of the plates 2 are rolled, or partially rolled, about the same as in the last mentioned figure. When the pivot members, illustrated in Fig. 4, are used these edges merely over-lap. These modified pivot members are in the form of headed pins 10 and only extend through one pair of ears 3 and 4.

In use the endless conveyer formed by the buckets is trained around suitable driving members such as the sprocket wheels 11.

These wheels are provided with teeth 12 which engage the rollers 6 and thereby cause the conveyer to move as said wheels revolve. The rollers are also adapted to act as guides for engagement with tracks 13 as shown in the broken lines in Fig. 1.

From the foregoing description taken in connection with the accompanying drawings it will be obvious that a very simply constructed endless conveyer has been produced by pivotally connecting together a plurality of conveyer members.

It is also evident that this structure will permit conveyers to be manufactured at considerably less cost than those in which the conveyer members are connected by means of chains or other flexible connectors.

I claim:

1. In an over-shot discharge conveying apparatus the combination with a pair of coöperating sprocket wheels, of a plurality of conveyer buckets, a pair of ears extending from adjacent corners of each bucket and pivotally connected with the other corners of an adjacent bucket, plates extending between the buckets and covering the spaces therebetween, sprocket wheel engaging members at the pivotal connections of said ears and buckets, one end wall of each bucket section being angular in cross section, whereby the upper portion of said wall is disposed in a plane which, when the buckets are swung together in passing around the sprocket wheel is substantially parallel to the connecting plate portion of the other bucket, while its lower or bottom portion is substantially parallel to the other end wall of the adjacent bucket in such position.

2. The combination with a sprocket wheel and tracks extending in substantially horizontal direction from the upper and lower portions thereof, of a plurality of conveyer buckets, a pair of ears extending from the sides of one end wall of each bucket, a pair of relatively longer ears extending from the sides of the other wall of each bucket and having their end portions in lapped relation to the short ears of an adjacent bucket, pivot bolts passed through the lapped portions of the ears, rollers on said pivot bolts engageable by the sprocket wheel and adapted to ride on the tracks, and a plate extension at the upper edge portion of each end wall adjacent the relatively long ears extending between said ears and terminating above the upper edge of the end wall of the adjacent section whereby to cover the space between the buckets, said space between the buckets permitting pivotal movement thereof together in passing around the sprocket wheels.

In testimony that I claim the foregoing I have hereunto set my hand at Milwaukee, in the county of Milwaukee, and State of Wisconsin.

CLARENCE E. STEERE.